May 18, 1965

F. H. S. ROSSIRE 3,184,188

STRESS SENSOR AND CONTROL SYSTEM FOR LIMITING
STRESSES APPLIED TO AIRCRAFT

Filed June 19, 1961

INVENTOR.
FRANCIS HENRY S. ROSSIRE

BY *Herbert L. Davis*

ATTORNEY

INVENTOR.
FRANCIS HENRY S. ROSSIRE

BY Herbert L. Davis

ATTORNEY

INVENTOR.
FRANCIS HENRY S. ROSSIRE
BY Herbert L. Davis
ATTORNEY

United States Patent Office 3,184,188
Patented May 18, 1965

3,184,188
STRESS SENSOR AND CONTROL SYSTEM FOR LIMITING STRESSES APPLIED TO AIRCRAFT
Francis Henry S. Rossire, Salisbury, Conn., assignor to The Bendix Corporation, Teterboro, N.J., a corporation of Delaware
Filed June 19, 1961, Ser. No. 118,023
6 Claims. (Cl. 244—77)

The present invention relates to a flexural stress sensor and to a control system operative thereby and method for limiting the control of a craft in response to the applied stress; and more particularly to a device in which flexural stress is measured by means of an instrument that samples a relatively small section of an airfoil surface of an aircraft or other mechanical structure and measures its stress together with means for applying the output of this instrument to a control system of an aircraft so as to limit the control thereof as a function of the stress applied to the airfoil surface of the aircraft to within predetermined safe stress limits.

An object of the present invention is to provide novel means to accurately measure structural stress.

Another object of the invention is to provide a novel device to accurately measure structural stress on parts of an aircraft or other vehicle while in motion, and a measuring device, embodying no moving parts to wear or to be susceptible to vibration, shock, or acceleration.

Another object of the present invention is to construct a flexural stress sensor that will not be permanently damaged when sampling an abnormal deflection as might occur on a wing or other airborne or shipborne member during a hard landing.

Another object of the present invention is to measure flexural stress on members that are not readily accessible.

Another object of the present invention is to enable an aircraft to carry disposable loads, and perform to the maximum allowable under all conditions of loading.

Another object of the present invention is to provide a system that will govern an aircraft flight pattern according to the stresses to which the airplane is subject.

Another object of the present invention is to provide a system that will limit the flight controls of an airplane proportional to the maximum permissible stress that the airplane can withstand.

Another object of the invention is to provide a novel method for sensing structural stress of an aircraft and applying a signal proportional to such stress so as to limit control of the aircraft to predetermined safe stress limits.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
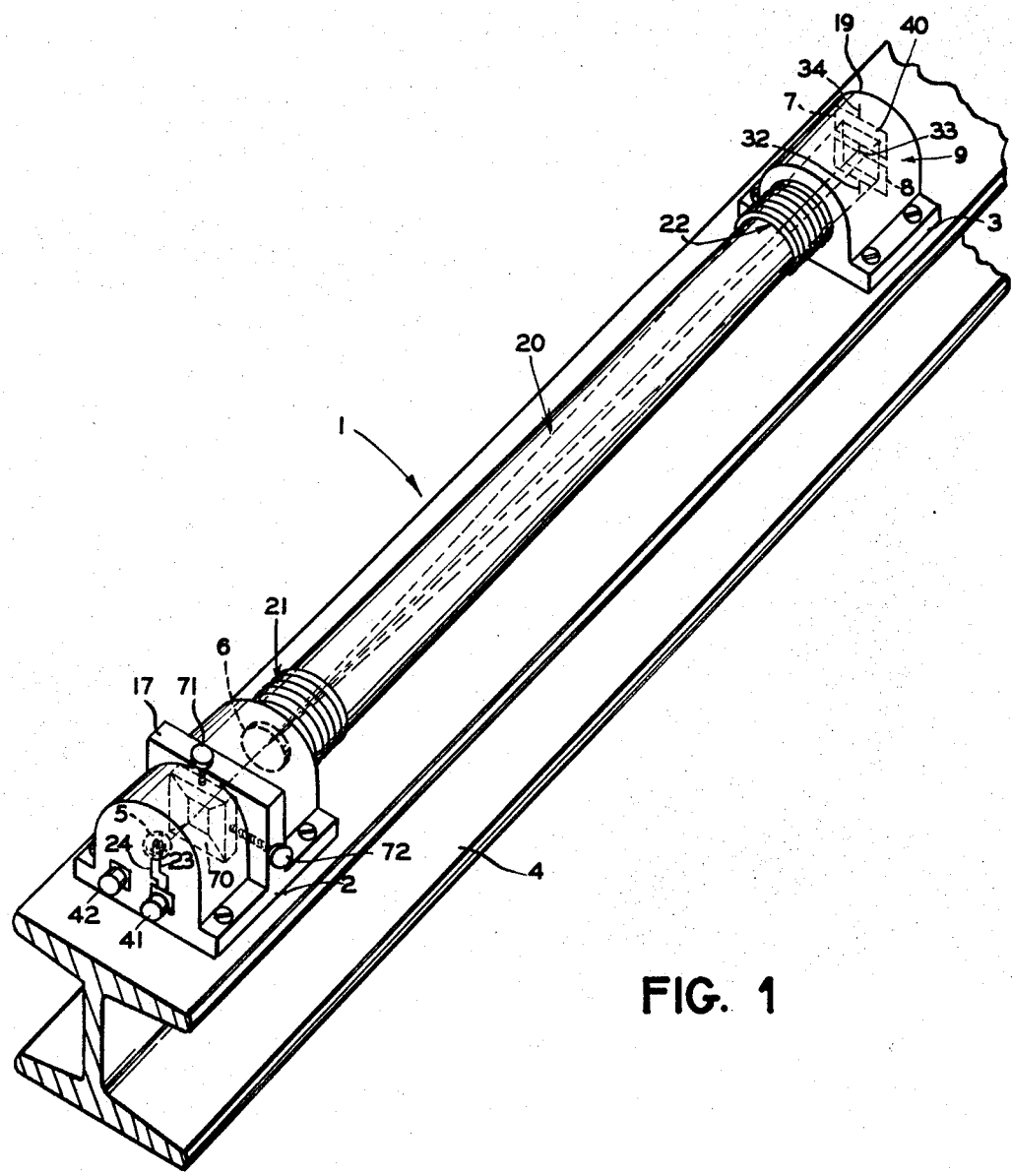
FIGURE 1 is a perspective view of part of the flexural stress sensor mounted on a structural element such as a spar of a wing of an aircraft and showing in dotted lines internal operating parts thereof.

Referring to the drawing of FIGURE 1 there is shown a tubular flexural stress sensor arranged in operative relation to a spar 4 so as to measure stress applied to an airfoil surface such as a wing of an aircraft in which the spar 4 may be mounted. The flexural stress sensor 1 is mounted securely by brackets 2 and 3 along the spar 4. Further mounted at one end of the tubular flexural stress sensor is a light source 5 and lens system 6. An object producing plate 70 is situated between the light source 5 and the lens system 6 to make an image on a photo sensitive component 9, comprising two photo sensitive elements 7 and 8, and located at the other end of the tubular flexural stress sensor 1. The image is to be a rectangular spot of light of dimension slightly less than half of the distance across both photo sensitive elements 7 and 8. There is an adjustment 71 to change the size, and an adjustment 72 to change the location of the image.

The light source 5, plate 70, and lens 6 are enclosed in a tubular connector member 17, closed at one end and securely mounted by the bracket 2 on the wing spar 4. The photo sensitive component 9 is mounted in a second enclosed tubular connector member 19 which is securely attached to the wing spar 4 by bracket 3. A third tubular member 20 is located in between the connector members 17 and 19 and is operatively connected to the members 17 and 19 by flexible corrugated members 21 and 22. Electrical leads 23 and 24 from the electric lamp or light source 5 are connected through a connector 41 of a conventional type to a suitable source of electrical energy, not shown.

Electrical leads 15, 32, and 34 are connected to the photo sensitive elements 7 and 8 which are part of a bridge circuit 18 (not shown in FIGURE 1 but shown schematically in FIGURE 2) located in tubular member 19. Leads 12, 13, 14, and 15 from the bridge circuit are connected to power sources and detectors through connector 42. The entire unit including the tubular members 17, 19, and 20 is sealed and filled with a dry inert gas to eliminate any problem of contamination of the light source or the lens system.

Lens systems 6 and plate 70 focuses the light from source 5 on the photo sensitive component 9. The photo sensitive component 9 is composed of two photo sensitive surfaces 7 and 8 aligned perpendicular to the light source, and which change resistance proportional to the amount of light that falls on them. The arrangement of the tubular flexural sensor 1 is such that the corrugated members 21 and 22 permits the connector member 17 to move relative to the tubular member 20 and the connector member 19 to move relative to the tubular member 20 upon flexure of the spar 4 in response to the applied stress, so that the beam of light from the light source 5 falls more on one of the photo sensitive surfaces 7 or 8 than on the other. Furthermore, the mechanical construction of the photo sensing unit 9 is such that if the light quantity increases on one surface 7 (or 8), it decreases proportionally on the other 8 (or 7). Therefore, if the resistance of 7 decreases due to an increase of light, the resistance of 8 will increase due to a decrease of light.

Figures 2, 3:
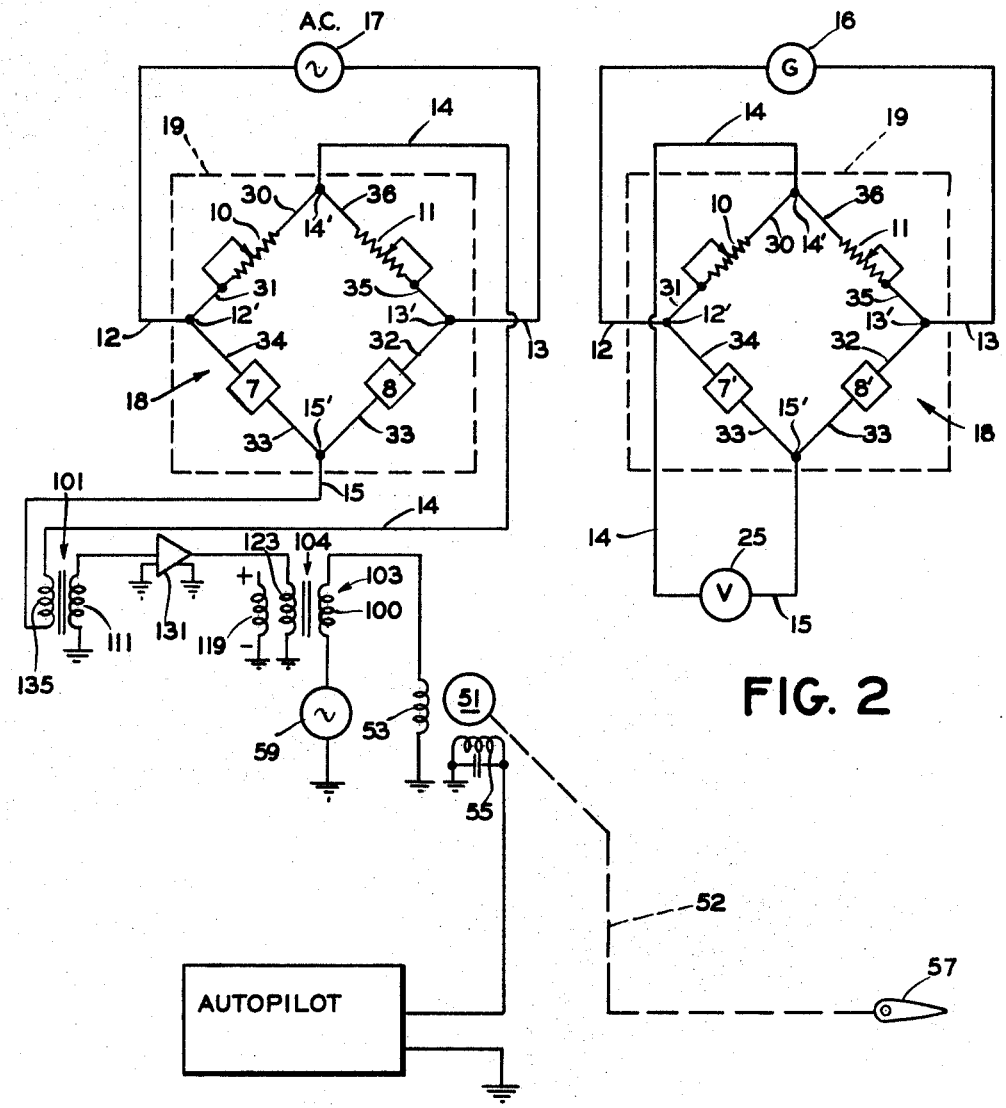
FIGURE 2 is a schematic drawing of the electrical bridge sensing device to be used in the flexural stress sensor.
FIGURE 3 is a schematic drawing of the electrical bridge of FIGURE 2, operatively connected to limit an automatic pilot or other operative means of a control surface of an aircraft to within predetermined safe stress limits.

The two photo sensitive elements 7 and 8 are part of a bridge network 18, shown in FIGURE 2 in which an electrical potential is applied from a suitable source of voltage excitation 16 through leads 12 and 13 to two opposite points 12' and 13' of the bridge 18. Two adjustable resistors 10 and 11 are placed in the remaining two adjacent arms of the bridge 18 and are connected together by conductors 30 and 36 meeting at point 14', and in turn connected to point 12' through conductor 31 and to point 13' through conductor 35. A detector 25 with two leads 14 and 15 is connected to points 14' and 15' of the bridge. When equal amounts of light fall on 7 and 8, and the resistance of 10 is initially adjusted to equal that of 7', and the resistance of 11 is initially adjusted to equal that of 8', the bridge is balanced and there is no voltage resultant across the detector 25. As the beam deflects, the quantities of light falling on photo sensitive elements 7 and 8 vary, and the resistances of the elements 7 and 8 vary, thereby causing a signal to appear across the points 14' and 15'. The detector 25 as shown here is a volt meter, however, it may be a frequency meter, or any other suitable detector that will record the electrical differences across points 14' and 15'. The reading on the meter is proportional to the flexure of the beam which is related to stress. The scale on the meter may be calibrated in volts, or units of deflection, or stress.

Moreover, as may be seen, the length of the stress sensor 1 and the distance between the light source 5, plate 70, and lens 6 and the photo sensitive element 9 may depend upon its application and the range of measurement.

Furthermore, through the novel arrangement of the tubular stress sensor 1 with illuminating lamp 5 and the photo sensitive elements 9, there are no moving parts to wear or to be susceptible to vibration, shock, or acceleration. Also, any stress such as, shipboard, or hard landings that might deflect the wing section beyond the limits of the wing stress sensor, will cause no structural damage to the tubular stress sensor nor any permanent calibration error.

Figure 4:
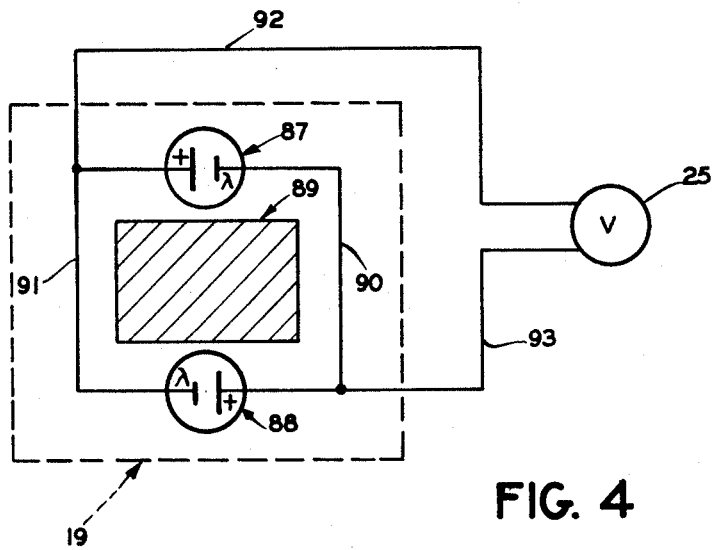
FIGURE 4 is a schematic drawing of an alternative electrical sensing device to be used in the flexural stress sensor of FIGURE 1.

As an alternative embodiment, the photo sensitive component 9 as shown in FIGURE 4, may consist of two photovoltaic cells 87 and 88 connected together by conductors 90 and 91 so that the positive of one cell is connected to the negative of the other cell. A detector 25, shown here as a volt meter, is connected by conductors 92 and 93 to conductors 91 and 90. When the spar 4 is unflexed, the image of light 89 (from the light source 5, focusing system 70, and lens system 6) is focused in between the two cells 87 and 88. As the spar 4 is flexed, the light image 89 moves with respect to the photovoltaic cells 87 and 88, and as the light beam falls on either cell 87 or 88, a current is generated therein which is recorded on the meter 25. It should be noted that the meter 25 will indicate first the magnitude of the current from the cell which is proportional to the amount of flexure, and second, the direction of the current which is determined by the direction of flexure (viz: whether the light image 89 falls on one cell or the other).

*Flight control limiter*

As an alternate application of the invention, in addition to measuring the actual deflection or stress in a member, the apparatus may be used as a governor of undesirable maneuvers during flight of the aircraft. For example, exceptionally tight turns, pull outs, and nose overs, etc. could cause fatal structural damage and/or incapacitation of the pilot and crew. To avoid such maneuvers and attendant difficulties, the flexural stress sensor may be operatively connected to the flight controls so as to monitor the stress applicable to the aircraft structure. As the applied stress exceeds a predetermined safe range, a control surface of the aircraft, for example, an elevator surface of the aircraft may be so controlled through operation of the stress sensor 1 as to limit the steepness of the maneuvers.

In the latter form of the invention, the flexural stress sensor may be attached to a wing spar 4 of the aircraft, as described above with reference to FIGURE 1. Moreover, the detector 25 of FIGURE 2 may be removed and the bridge output 14'–15', as shown in FIGURE 3, operatively connected in a control system for limiting the output of a servo motor for positioning an elevator surface normally controlled by an automatic pilot. The control system may be of a type such as described and claimed in a copending U.S. application Serial No. 697,053, filed November 18, 1957, now U.S. Patent No. 3,008,078 by Marvin Masel and Harold Moreines and assigned to The Bendix Corporation. Further, a suitable source of alternating current 17 is connected across the bridge 18 of FIGURE 3.

Furthermore, in the operative arrangement of FIGURE 3, a two phase motor 51 is drivably connected to a control surface, for example, elevator surface 57 of an aircraft by a linkage 52. Automatic pilot command signals and follow-up are connected to variable phase winding 55 of motor 51 for controlling speed and direction of rotation of the motor. Fixed phase winding 53 is connected to a source of alternating current 59 by a series connected variable impedance winding 100. The voltage across fixed phase winding 53 is constant when the spar 4 of the craft is not subjected to stress and the motor torque is controlled solely by the automatic pilot command signals and follow-up applied to the variable phase winding 55.

Flexural stress sensor 1 will, however, vary the voltage in fixed phase winding 53 whenever the spar 4 and airfoil surface or wing of the aircraft is subject to abnormal stress. The output of flexural stress sensor 1 is fed into an inductive device 101 having a primary winding 135, which is connected across the bridge at 14'–15'. The output of the bridge induces an alternating current in a secondary winding 111. The induced current is amplified and rectified by an amplifier rectifier 131 and then applied to a primary winding 123 on a core 104 of a saturable reactor 103. Core 104 of reactor 103 is biased to saturation by a biased winding 119 and the rectified current in primary 123 opposes the saturating effect of the current in winding 119 so that the core 104 becomes less magnetized and increases the impedance of secondary winding 100 of reactor 103. As the wing spar 4 is stressed, the bridge becomes unbalanced, resulting in an increased current in the secondary winding 111 and an increase in the impedance of winding 100.

As the impedance of winding 100 increases, the voltage across motor fixed phase winding 53 decreases so that the maximum motor torque decreases accordingly since the maximum motor torque is approximately proportional to the production of the voltage available across the motor winding 53 and 55.

The resulting decrease in the torque applied by the motor 51 to the elevator 57 will then permit the aerodynamic forces applied to the control surface 57 to effect a readjustment thereof in a sense to reduce the stress applied to the wing spar 4 and airfoil surface to predetermined safe limits.

Thus the control device described provides an effective and reliable means for limiting the maneuver of an airplane as a function of the actual stress applied on its members by changing the voltage applied to the fixed phase winding of the control surface actuating motor and thereby limiting the authority of a command signal applied to the actuating motor.

Figure 5:
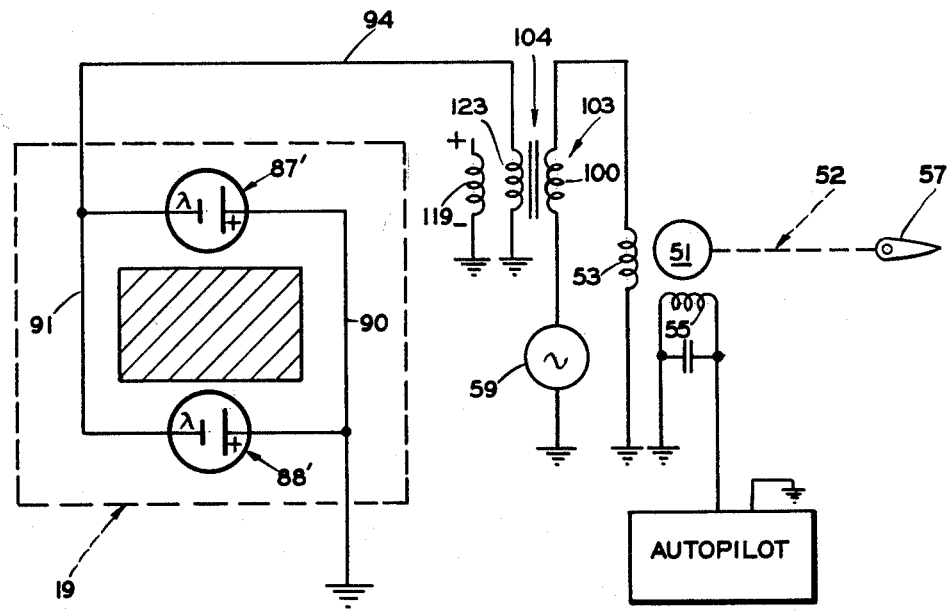
FIGURE 5 is a schematic drawing of the alternative electrical sensing device of FIGURE 4, operatively connected to limit an automatic pilot or other operative means of a control surface of an aircraft to within predetermined safe stress limits.

An alternative embodiment of the flight control limiter is shown in FIGURE 5 which resembles flight control limiter circuit of FIGURE 3. The difference herein consisting of replacing the two photo conductive elements 7 and 8 and attendant bridge circuit 18 of FIGURE 3 by the photovoltaic cells 87' and 88' connected together by conductors 90 and 91, as shown in FIGURE 5. It being noted, however, that the photovoltaic cells 87' and 88' are connected with their negative sides connected to conductor 91 and their positive sides connected through conductor 90 to ground. The light image 89 from the lens source focusing plate 70, and lens 6 falls in between the two photovoltaic cells 87' and 88' for the unflexed position. The output of the two cells is connected to a control system of the type shown in FIGURE 3. As the airfoil surface 4 on which the flexural stress sensor is mounted is flexed, the beam of light 89 will fall on either of the photovoltaic cells 87' and 88' thereby producing a controlling current which flows through conductor 94 into coil 123 of the saturated reactor 104 so that the operation of this alternative embodiment with respect to the control system for motor 51 is substantially the same as explained above in the description accompanying FIGURE 3 and need not be repeated here.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a system for controlling an aircraft to prevent excessive damage of an aircraft wing spar, the combination comprising a sensor mounted on said spar for providing a signal corresponding to the deformation of said spar, said sensor including a light source and lens system mounted at one portion of the spar, and two photosensitive elements longitudinally spaced along said spar relative to said light source and lens system and being arranged so that when the spar is in normal position, light from said light source falls in equal amounts on both photosensitive elements and upon deformation of the spar from said normal position due to stress being applied to said spar, the light source and lens system are displaced relative to said photosensitive elements so as to cause the amount of light falling on one photosensitive element to increase and on the other photosensitive element to decrease, and means connected to the photosensitive elements to provide a differential stress signal proportional to the deformation of said spar.

2. The structure of claim 1 in which the means for providing a differential signal comprises a comparator circuit responsive to the light falling on the photosensitive elements and providing an output corresponding to the stress on said spar, the comparator circuit being normally balanced when the wing spar of the aircraft is in normal position.

3. The structure defined by claim 1 in which the means for providing a differential signal comprises a comparator circuit responsive to the light falling on the photosensitive elements to provide a differential stress signal corresponding in amplitude and phase to the magnitude and direction of the stress applied to said spar, and means for controlling the aircraft connected to said comparator circuit for receiving the differential stress signal to control the aircraft to prevent excessive deformation of said spar.

4. The structure defined in claim 1 in which the means for providing a differential signal comprises a normally balanced electrical bridge having four legs, two of which legs include the photosensitive elements, and the other two legs include impedances, the bridge being electrically balanced when the wing spar of the aircraft is in normal position.

5. The structure defined in claim 1 in which said two photosensitive elements comprise a pair of photovoltaic cells connected together by conductors and positioned substantially perpendicular to the predominant stress application, wherein the light from said light source is directed substantially centrally between said cells when said spar is in normal position, and means connected to said cells for controlling the aircraft within a predetermined safe stress range applied to said spar when the applied stress upon said spar is in one direction displacing the light from said light source from said centrally located position to one cell, and when the applied stress upon said spar is in another direction displacing the light from said light source from said centrally located position to the other cell.

6. In a system for controlling an aircraft to prevent excessive damage of an aircraft wing spar, the combination comprising a sensor mounted on said spar for providing a signal corresponding to deformation of said spar, said sensor including a pair of controlled elements, means to control said elements, said control means being mounted at one portion of the spar, and said pair of controlled elements being longitudinally spaced along said spar relative to said control means and being arranged so that when the spar is in a normal condition, said control means acts equally on both of said controlled elements and upon deformation of the spar from said normal condition due to stress being applied to said spar, the control means is displaced relative to said pair of controlled elements so as to differentially effect in magnitude and sense the controlling action of said control means on said pair of controlled elements dependent upon the magnitude and the sense of the stress applied to said spar.

References Cited by the Examiner
UNITED STATES PATENTS

| | | | |
|---|---|---|---|
| 2,136,223 | 11/38 | Thomas | 250—231 |
| 2,286,150 | 6/42 | Mercier | 244—42 |
| 2,289,551 | 7/42 | Reason | 177—351 |
| 2,929,242 | 3/60 | Bell | 73—88 |
| 2,949,258 | 8/60 | Bell | 244—77 |
| 3,008,078 | 11/61 | Masel | 318—489 |
| 3,037,725 | 6/62 | Treffeisen | 244—77 |

FERGUS S. MIDDLETON, *Primary Examiner.*

R. DAVID BLAKESLEE, MILTON BUCHLER,
*Examiners.*